United States Patent [19]
Stillman

[11] Patent Number: 5,599,360
[45] Date of Patent: Feb. 4, 1997

[54] METHOD FOR THE MANUFACTURE OF CHAR-CONTAINING ARTICLES

[76] Inventor: Robert O. Stillman, 200 E. 62nd St. Apt 22A, New York, N.Y. 10021

[21] Appl. No.: 351,699

[22] Filed: Dec. 8, 1994

[51] Int. Cl.[6] ................................................ C10L 5/02
[52] U.S. Cl. .................... 44/522; 44/530; 44/590; 44/595; 44/596; 44/598
[58] Field of Search ........................... 44/530, 502, 522, 44/590, 591, 595, 597, 596, 598

[56] References Cited

U.S. PATENT DOCUMENTS

| | | | |
|---|---|---|---|
| 1,102,591 | 7/1914 | Kalitsch | 44/590 |
| 1,780,205 | 11/1930 | Maurel | 44/530 |
| 2,341,377 | 2/1944 | Hinderer | 44/590 |
| 2,770,854 | 11/1956 | Miszeika | 44/522 |
| 3,227,530 | 1/1966 | Levelton | 44/590 |
| 3,351,444 | 11/1967 | Ryan et al. | 44/502 |
| 3,938,965 | 2/1976 | Pyle | 44/502 |
| 3,955,937 | 5/1976 | Whang . | |
| 4,102,653 | 7/1978 | Simmons et al. | 44/590 |
| 4,243,393 | 1/1981 | Christian | 44/522 |
| 4,878,922 | 11/1989 | Kaye | 44/502 |

*Primary Examiner*—Margaret Medley
*Attorney, Agent, or Firm*—Sofer & Haroun, LLP

[57] ABSTRACT

A process for manufacturing charcoal and intermediate char-containing articles from paper and/or paperboard comprises forming an aqueous pulp of cellulose fibers from the paper or paperboard and blending the aqueous pulp with comminuted char in a dry or slurried state. The resulting mixture may be shaped into any desired form, such, for example, as briquettes, by forcing the mixture into a perforated die or porous mold to form substantially rigid articles. The formed product is dried in a kiln.

15 Claims, 3 Drawing Sheets

5,599,360

METHOD FOR THE MANUFACTURE OF CHAR-CONTAINING ARTICLES

BACKGROUND OF THE INVENTION

1. Field of the Invention

The present invention relates to the manufacture of char-containing solid fuels and adsorbents, and more particularly, to combustible and adsorbitive articles which can be manufactured by blending comminuted char with an aqueous pulp of cellulose fibers.

2. Description of the Related Art

Charcoal is a solid carbonaceous material manufactured by the destructive distillation of wood and is utilized in such industrial processes as metal ore reduction, carburizing, and chemical compound manufacture. In its activated form, charcoal is in granular form as an adsorbent. When char is employed in adsorption processes, it is in powder or granular form and supported within fixed or pulsed beds, or contained within canisters. Although the need for such support would be obviated by the introduction of suitable binders, binders tend to coat and/or cover the internal pores of the adsorbent and thereby diminish its capacity and efficacy for adsorption.

Charcoal is also commonly used as a cooking fuel due to its substantially smokeless and flameless combustion. As a fuel, however, char is difficult to ignite due to the relatively high content of fixed carbon and the correspondingly low content of volatile constituents. Generally, combustible additives are utilized either during manufacture or at the point of consumption to promote the ignition of the fuel. Accordingly, a process for producing char-containing combustible articles and intermediate char-containing product which do not suffer from the disadvantages noted above, from available raw materials such as paper and paperboard, would also benefit the environment.

The inventor's prior application U.S. patent Ser. No. 08/274,785 is hereby incorporated by reference.

SUMMARY OF THE INVENTION

It is therefore an object of the present invention to demonstrate the manufacture, from activated char, of adsorbents of superior mechanical strength which do not require supports.

It is another object of the present invention to provide a process for forming char-containing combustible articles which can be readily ignited by an applied flame without the assistance of supplemental ignition-promoting additives.

It is yet another object of the present invention to enable the manufacture of a greater variety of shapes and sizes of char articles, and to thereby realize articles possessing not only an enhanced aesthetic appearance, but also optimal combustion characteristics for the intended application.

It is a further object of the present invention to provide a process of manufacturing combustible, char-containing articles utilizing a fibrillar binder derived from waste paper sources, thereby conserving natural resources in an effective, yet economically attractive manner.

The aforementioned objects, as well as others which will become apparent to those skilled in the art, are achieved by a process which utilizes waster paper and/or paperboard as a raw material. As utilized herein, the terms "paper" and "paperboard" include but are not limited to newspaper, linerboard, corrugating medium, boxboard, writing and printing papers, tissue, construction paper, kraft paper, and cardboard.

In accordance with one aspect of the inventive process disclosed herein, char-containing articles such, for example, as incense and combustible fuel products, are provided with a fibrillar binder which enables ignition of the char by contact of the article with the flame of a match, without the use of lighter fluids or supplemental fuels. Pulverized char is bound by cellulose fiber derived principally from paper and paperboard. In addition to conferring rigidity and strength to the article, the cellulose fiber facilitates ignition. The fibrillar binder is non-invasive with respect to the internal pores of the char particles and consequently does not diminish its adsorptive capacity. Moreover, in the forming operation, the char and fiber are handled as a slurry and can be made to take a wide variety of shapes within corresponding dies and molds, in contradistinction to the limitations imposed by conventional briquetting practice.

A mechanical pulping machine is charged with a mixture of water and paper and/or paperboard. The mixture is agitated until the fibers of the paper/paperboard disengage to form an aqueous pulp. The pulp thus produced is strained to remove undesired extraneous matter such, for example, as tape, rope, clips and staples. The aqueous pulp, pulverized char, water and a surfactant, a surface active agent which facilitates the mixing of the hydrophobic char particles with water, are combined and interdispersed within a vessel, by the action of an impeller, to form a slurry. The slurry is conveyed to a press or extrusion machine, and a substantial portion of the water present therein is removed.

As the slurry is injected into a mold or forced through a die, the char and fiber consolidate into a desired form. The cellulose fiber binder not only provides much needed internal strengthening of the articles so produced, but also facilitates the ignition of the char, thereby obviating or at least substantially reducing the need for supplemental ignition aids, either during manufacture or at the point of consumption. The shape of the article is determined by the shape of the die into which the pulp is extruded, pressed or cast, and consequently, a wide variety of forms and sizes is readily achieved.

The greater variety in form and size obtained by the inventive method may be exploited for aesthetic purposes as well as the functional properties conferred by shape. For example, articles formed with cavities similar in appearance to a honeycomb define an increased surface area exposed to air, thereby promoting more rapid combustion. Additionally, such cavities in the article may serve to facilitate the introduction of flavorings, fragrances and spices, such as mesquite or hickory.

Green char-containing articles formed in accordance with the present invention are dried in a drying apparatus by direct and countercurrent exposure to hot combustion gases. The drying procedure removes residual moisture from the article and enhances considerably its strength.

Other objects and features of the present invention will become apparent from the following detailed description considered in conjunction with the accompanying drawings. It is to be understood however, that the drawings are designed solely for the purpose of illustration and not as a definition of the limits of the invention, for which reference should be made to the appended claims.

BRIEF DESCRIPTION OF THE DRAWINGS

An understanding of the present invention will be facilitated by the detailed description of an illustrative embodiment set forth herein in combination with reference to the annexed drawings, in which.

DETAILED DESCRIPTION OF THE INVENTION

Figure 1:
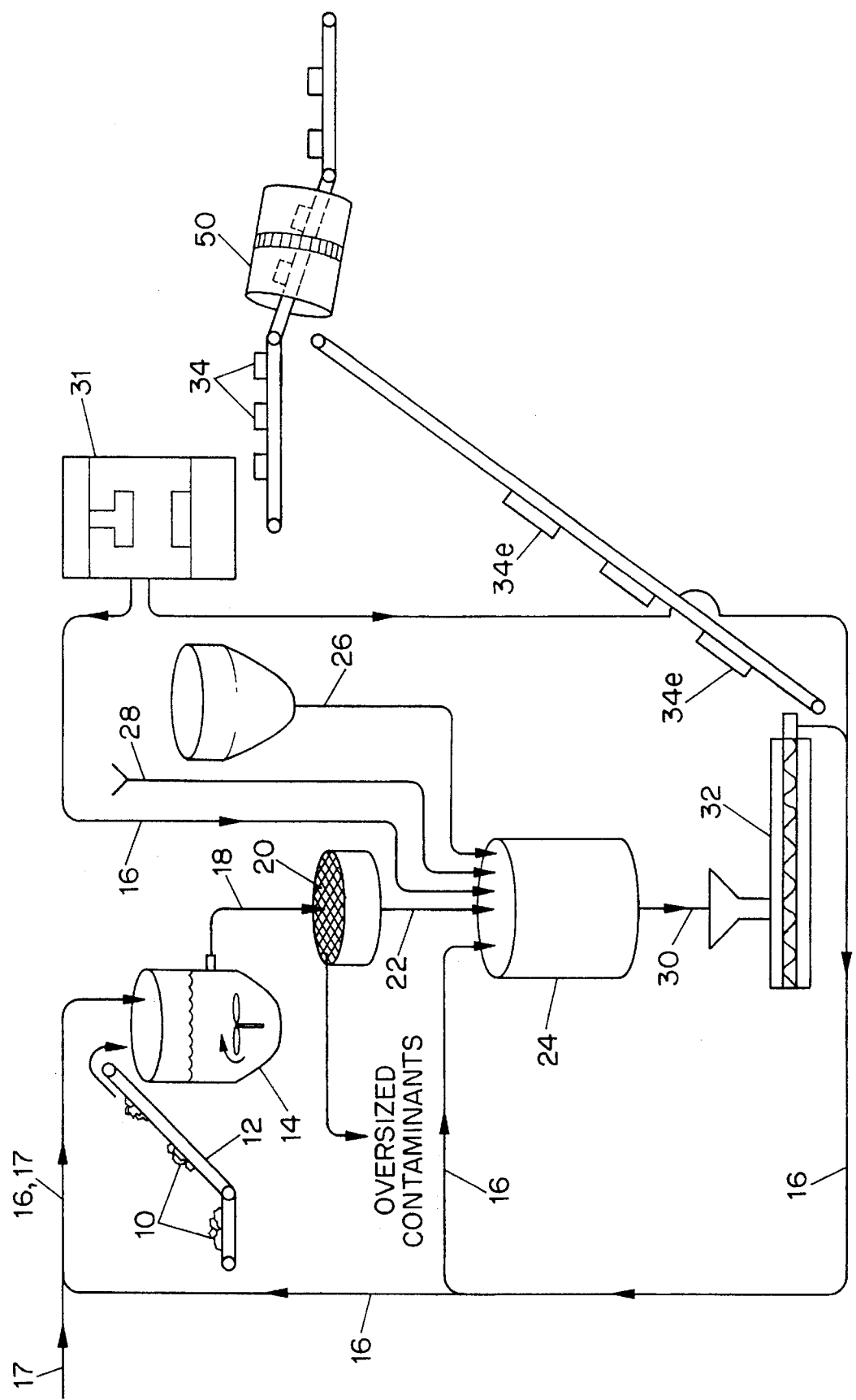
FIG. 1 is a progressive schematic rendering of the steps in the forming of combustible, char-containing products in accordance with an illustrative embodiment of the inventive method.

With particular reference to FIG. 1, an illustrative embodiment of the inventive process for the manufacture of articles containing char will now be described in detail. Material containing cellulose fiber 10 is conveyed in a conventional manner, such as by way of conveyor 12, to a pulper 14. Recycled process water 16, and make-up water 17, is combined with the material containing cellulose fiber 10 and ground into a raw pulp 18, which pulp is screened through a screening device 20 to remove undesired extraneous material such as tape, rope, clips, or staples.

Screened pulp 22 is conveyed to a mixing tank 24 wherein it is combined with pulverized char 26, recycled process water 16, and surfactant 28. The pulverized char 26, recycled process water 16, surfactant 28 and screened pulp 22 are interdispersed by the action of an impeller (not shown), and the resulting slurry 30 is withdrawn from the mixing tank 24 and conveyed to a device which dewaters the slurry and converts the same into green char articles. In this regard, it will be readily appreciated by those skilled in the art that any suitable dewatering/article forming device may be utilized for the present invention. Illustratively, a press, an extruder, a deckle, a continuous paper making machine, or a porous mold into which the slurry is cast and through which the water drains by the action of gravity or by an imposed vacuum may be utilized.

Figure 2:
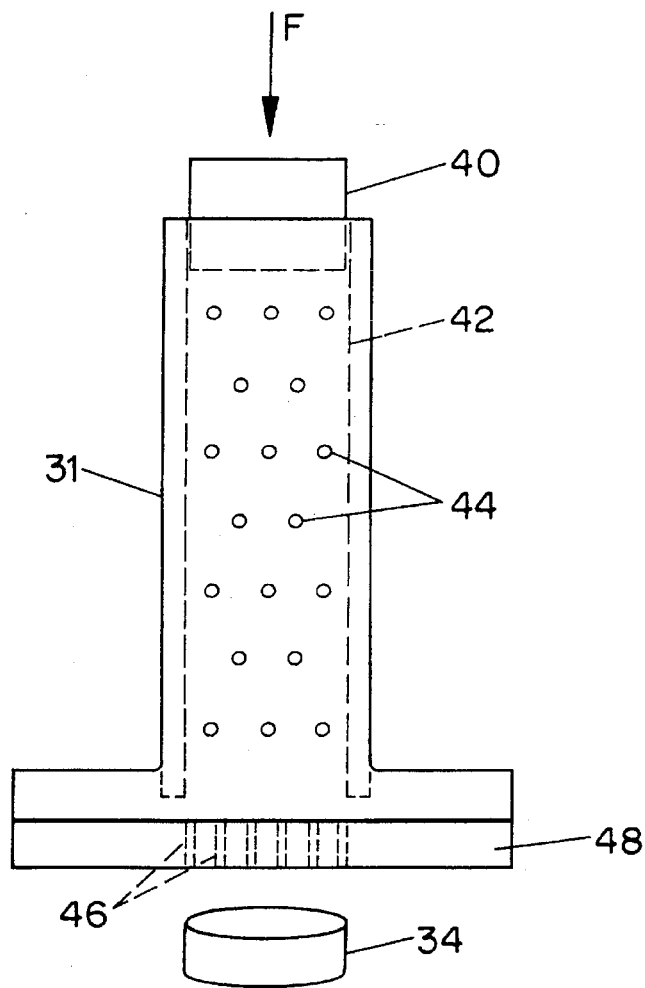
FIG. 2 is a front elevational view of a die press utilized to form green char-containing articles in accordance with an illustrative embodiment of the inventive process.

In the illustrative embodiment of the present invention depicted in FIG. 1, both a die press 31 and an extruder 32 are employed to dewater the slurry 30 and form green char-containing articles therefrom. Press 31 removes water from the slurry 30 and thereby converts the slurry into green char articles 34. As shown in FIG. 2, press 31 includes a reciprocating piston 40 that moves within a perforated die barrel 42. After the slurry has been introduced into perforated die barrel 42, an axial compressive force is applied in the direction of arrow F, as may be generated by a hydraulic cylinder or similar device (not shown).

As the piston travels downward, water is expelled through apertures 44 and drain channels 46 and the remaining mixture of pulverized char 26 and cellulose fiber 22 is compressed by the die (not shown). The piston 40 is withdrawn when no further dewatering or compaction is evident at the applied pressure, which pressure may, for example, be approximately 10,000 psig. The resulting green char-containing articles 34 may then be ejected by removing the base flange 48 and reapplying an axial force to the die.

Figure 3A:
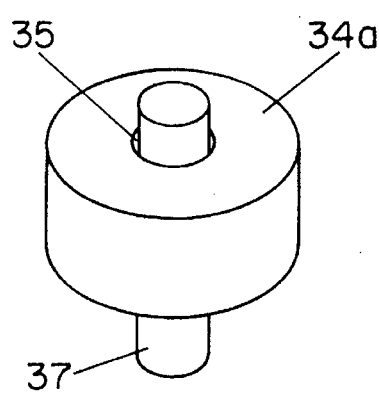
FIGS. 3A–3E are perspective views depicting various novel char-containing articles produced in accordance with an illustrative embodiment of the inventive process.

As will be readily appreciated by those skilled in the art, a wide variety of article shapes and sizes may be obtained by pressing or extruding the slurry 28 into a correspondingly shaped die or mold cavity. Thus, and with particular reference to FIGS. 3A–3D, there are shown several illustrative configurations. In FIG. 3A, for example, there is shown a toroidally shaped char-containing article 34a having a central aperture 35. For barbecue briquette applications, the central aperture may be dimensioned to receive a plug 37 of hickory or mesquite inserted for flavor. Illustratively, the material inserted into the central aperture may be impregnated with such flavorings or may comprise the mesquite or hickory wood. Alternatively, rolled paper may be inserted into the aperture to facilitate ignition.

Figure 3B:
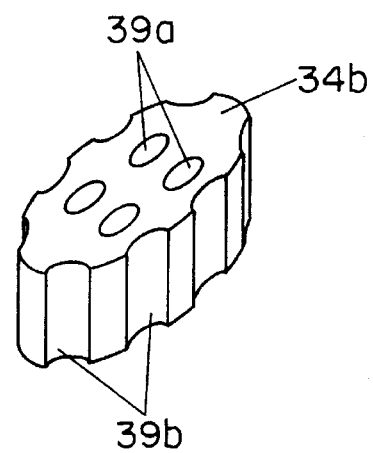

In FIG. 3B, there is shown a green briquette article 34b having a substantially honeycomb-shaped configuration defined by a pattern of bores/cavities 39a and recesses 39b. These cavities and recesses promote more rapid combustion of the fuel because they increase the amount of surface area exposed to the air, and because they define a more shallow diffusion path, thereby enhancing mass transfer of oxygen and gaseous combustion byproducts to and from the combustion zone.

Figure 3C:
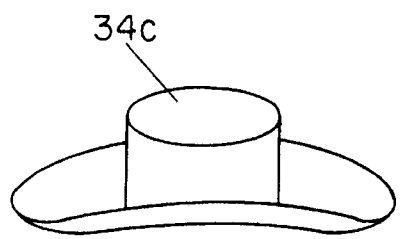
Figure 3D:
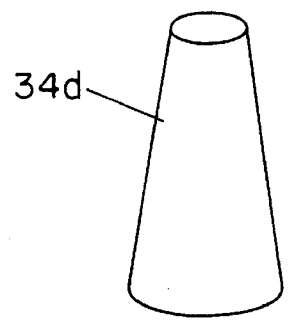
Figure 3E:
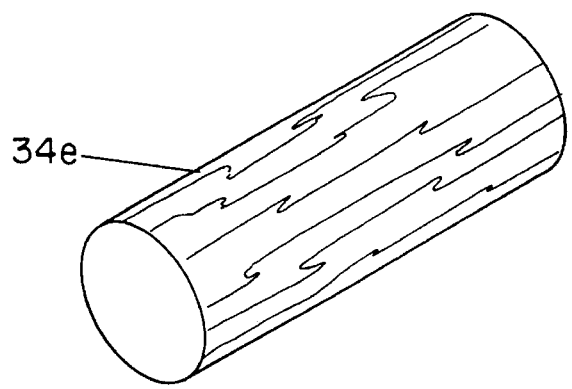

Although the shape of the char-containing articles may be selected to optimize the combustion and flavor-imparting properties of the finished product, as in the case of FIGS. 3B and 3A, respectively, it is also possible to realize a variety of decorative shapes as well. One such article, generally identified by reference numeral 34c, is shown in FIG. 3C. A frustoconically shaped article 34d, as may be utilized in a fragrant incense product, is shown in FIG. 3D. If, however, it is desired to obtain a fireplace log-shaped article, the slurry 22 may be conveyed instead to extruder 32 (FIG. 1) for extrusion and subsequent cutting to form an article such as the cylindrically shaped article 34e of FIG. 3E.

Figure 4:
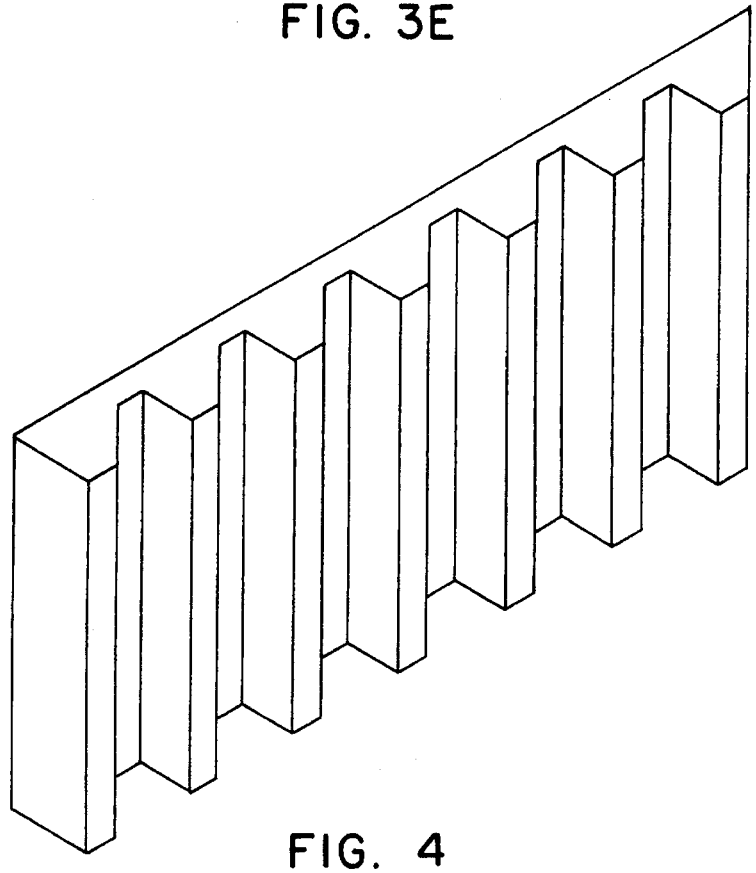
FIG. 4 is a perspective view of a novel, pleated filter article produced in accordance with an alternate embodiment of the inventive process.

As is evident, the shape of the char-containing article is determined by the shape of the die or mold in to which the slurry 22 is extruded, pressed or cast, and consequently a wide variety of forms and sizes can be readily achieved, in contradistinction to the limitations imposed by the use of a roll press in conventional briquetting practice. The greater variety in form and size can, as already discussed, be used for aesthetic purposes or to optimize functional properties conferred by shape. Another advantageous feature of the present invention is that the density and porosity of the char articles can be regulated by varying the compressive force exerted upon the slurry 22. As will be readily appreciated by those skilled in the art, the density and porosity of the char article affects many of its properties. Illustratively, green char articles as article 34 formed by high compressive forces result in char articles of high density, low porosity, high fuel value (i.e. calorific value per unit of volume), low rate of combustion, and superior mechanical characteristics in respect of shipping and handling. Alternatively, the compressive forces applied to the slurry 22 may be formed into a pleated filter as shown in FIG 4. Such filters may find application in appliances such as air handlers, microwave ovens and air conditioners.

As explained above, both the press 31 and extruder 32 are devices that remove water and form green char articles as 34 and 34a–34e. The water 16 that is removed in this manner is combined with make-up water 17 and furnished to the pulper 14 and mixing tank 24 as process water 16. The green char articles as article 34, which are produced from either press 31 or extruder 32 in accordance with the illustrative dewatering and shaping processes described above, are then dried to remove residual moisture therefrom.

Moisture contained in briquette or other char-containing articles produced in accordance with the process of the present invention is much more easily removed than the moisture contained within the wood materials employed in conventional processes. Water in wood is confined with the fibrillar cells and intercellular spaces of the plant tissue and removal of the water requires significant energy and time. Moreover, the dehydration of wood limits the fixed heat transfer area of drying, thereby reducing the throughput of the drying process. In contrast, and as will now be described in detail, residual water in the aqueous pulp-derived briquettes of the present invention may be removed rapidly and with minimum energy consumption.

The residual moisture in the green char-containing articles 34 may be removed by direct evaporation to the atmosphere, by a drying apparatus, by a carbonization retort/kiln, or by a combination of these techniques.

EXAMPLE

Utilizing the die press structure 31 depicted in FIG. 2, cylindrical char briquettes were produced from a variety of stocks. Newsprint, kraft and writing papers were converted into pulp by shredding these stocks manually, combining them with water in a blender and blending the paper and water mixture for 30 seconds at high speed. Pulverized char and surfactant were added to the pulp and the contents of the blender were further blended for 30 seconds.

The slurry of char and aqueous pulp was introduced into perforated barrel 42 and a green char article 34 having a height and diameter of 1.3 inches was formed by the action of the compressive force applied by the piston 40 upon the pulp. The piston was withdrawn when a pressure of 10,000 psig produced no further dewatering or compaction. The drying of the green char article 34 was accomplished in a Thermolyne type 1400 oven at 200 degrees fahrenheit. Drying of the briquette was deemed complete when the weight of the briquette remained constant with respect to time.

As will be readily appreciated by those skilled in the art, the inventive process of the present invention, as well as the articles produced thereby, differs from contemporary processes with respect to the manner by which the pulverized char is formed into cohesive shapes, the use of binders, and the means by which ignition is accomplished. Specifically, the articles of pulverized char bound by paper or paperboard product-derived fibers in accordance with the inventive process described herein possess substantially enhanced rigidity and strength and substantially enhanced ignition and combustion properties.

Although only several illustrative embodiments of the present invention have been described in detail, it will be apparent to those skilled in the art that the invention is not so limited. It will therefore be understood that the above-described embodiments are presented as examples only, and that these may be modified in various ways within the scope of protection defined by the appended patent claims.

What is claimed is:

1. A process for fabricating char-containing combustible products, comprising the steps of:

providing, in a first providing step, an aqueous pulp containing cellulose fibers, said pulp comprising a mixture of water and at least one processed cellulosic material selected from the group consisting of waste paper and paperboard;

providing, in a second providing step, a communited char;

blending the communited char and aqueous pulp to form a slurry; and conveying said slurry to a press or an extrusion machine to form at least one char-containing product.

2. The process according to claim 1, further comprising the step of drying said char-containing product in a drying apparatus.

3. The process according to claim 1, further comprising a step of admixing a surfactant with the aqueous pulp during said blending step.

4. The process according to claim 1, wherein the extrusion machine has a barrel wherein water present in said slurry may drain through perforations in the barrel.

5. The process according to claim 1, wherein the press is provided with a porous mold, wherein water present in said slurry may drain through pores in the porous mold.

6. The process according to claim 1, wherein the press is a mechanical press.

7. The process according to claim 1, wherein the communited char is derived from a feedstock comprising at least one material selected from the group consisting of wood, paper, paperboard, sewerage sludge, coal, rubber tires, biomass, agricultural waste, and organic municipal waste.

8. The process according to claim 1, wherein the char is further communited during said second providing step.

9. The process according to claim 1, wherein the ratio by weight of char to pulp, on a dry basis, is between from 3:1 to 5:1.

10. The process according to claim 1, further comprising an element selected from the group consisting of a fragrant additive and a flavoring releasable during combustion of said char-containing product.

11. The char-containing combustible products produced by the process of claim 1.

12. The char-containing combustible products produced by the process of claim 10.

13. The product of claim 12, wherein said product is an incense cone.

14. The product of claim 12, wherein said product is a barbecue briquette impregnated with one of a mesquite or hickory flavoring.

15. The product of claim 11, wherein said product is a briquette defining a plurality of bores extending therethrough.

* * * * *